Figures 1, 2:
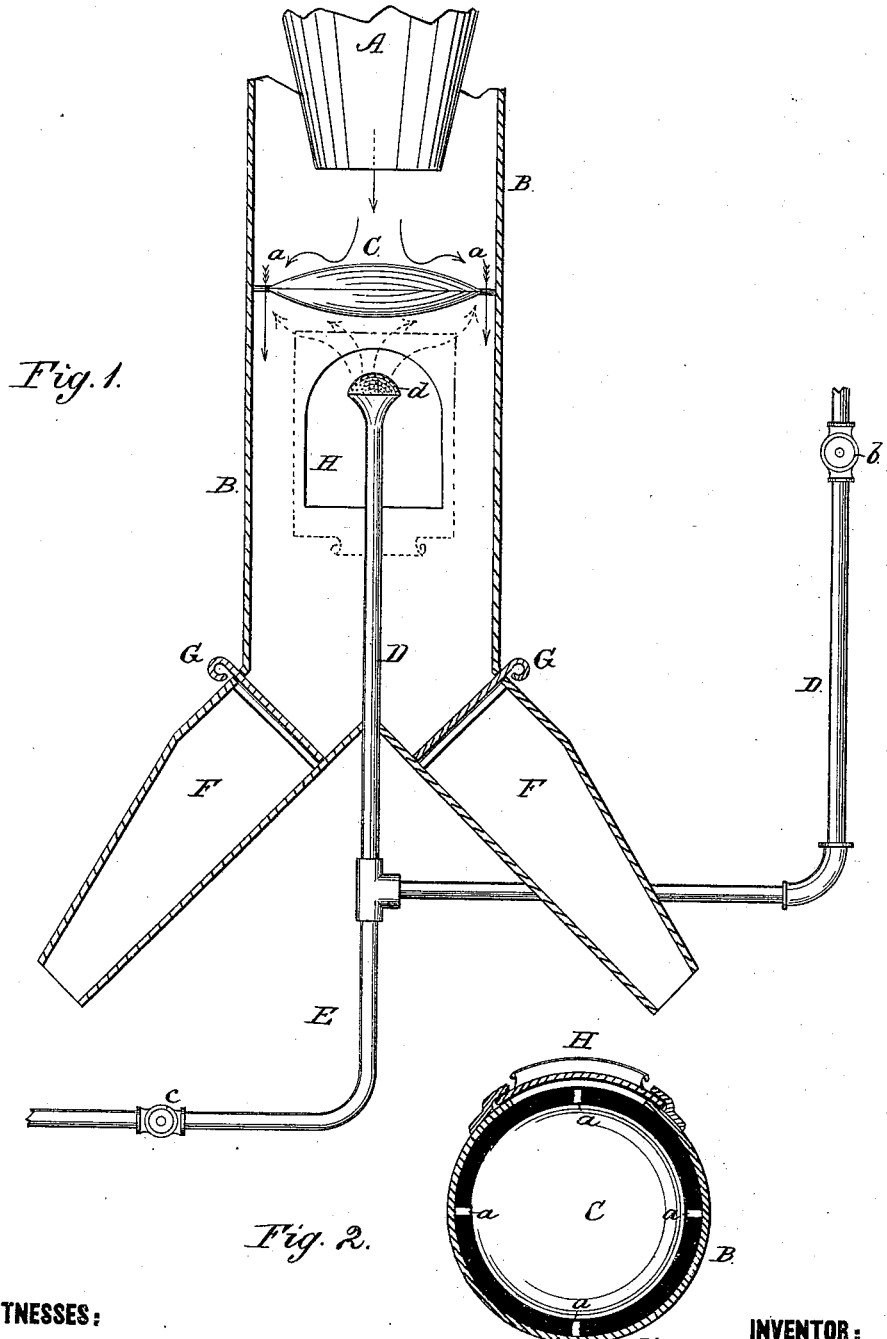

E. C. JONES.
GRAIN-STEAMERS.

No. 193,711. Patented July 31, 1877.

WITNESSES:
W. W. Hollingsworth
Edw. W. Byrn

INVENTOR:
Edward C. Jones
BY
ATTORNEYS.

N. PETERS, PHOTO-LITHOGRAPHER, WASHINGTON, D. C.

UNITED STATES PATENT OFFICE.

EDWARD C. JONES, OF INDEPENDENCE, MISSOURI.

IMPROVEMENT IN GRAIN-STEAMERS.

Specification forming part of Letters Patent No. 193,711, dated July 31, 1877; application filed June 21, 1877.

*To all whom it may concern:*

Be it known that I, EDWARD C. JONES, of Independence, in the county of Jackson and State of Missouri, have invented a new and Improved Grain-Steamer; and I do hereby declare that the following is a full, clear, and exact description of the same, reference being had to the accompanying drawing, forming part of this specification, in which—

Figure 1 is a side view of the steamer with the outer case in vertical section. Fig. 2 is a transverse section taken above the deflector, and looking down upon the same.

My invention relates to an improved device for steaming grain just before it is ground, for the purpose of softening the cuticle, and thereby facilitating the removal of the bran.

The improvement consists, principally, in the construction and arrangement of a deflector, located in the casing, and adapted to scatter or spread the descending grain, and at the same time to spread and divert the steam through the grain in its descent.

The invention also consists in the combination of said deflector with the steam and drain pipes and their valves, and with the chutes and their cut-off slides, as hereinafter more fully described.

In the drawing, A represents the spout leading from the stock-hopper, and entering the casing or other shell B of the steamer. C is the deflector, which is made of a less diameter than the casing B, so as to leave an annular space between the same, down which the grain passes. Said deflector is suspended in the casing by radial supports $a$, and is made with a rounded or convex upper surface, and a similarly rounded or convex lower surface, the rounded upper surface being designed to scatter and distribute the grain which falls upon it in an even and uniform manner about its sides and down the annular opening, while the convex lower side is designed to deflect and distribute the steam from a subjacent pipe through the falling grain, so as to cause the latter to be uniformly steamed or moistened. Instead of forming the deflector with convex sides, as shown, however, they may be made conical, to effect the same result. D is the steam-pipe, which enters the casing from below, and passes in a vertical direction to a point close to the deflector, (about one inch therefrom,) and immediately below the center of the same, where it terminates in a rose or finely-perforated nozzle, $d$. This pipe serves to supply the steam to the casing from a boiler, which steam is regulated or entirely cut off, when desired, by means of a valve, $b$, in said pipe. E is a drain-pipe, which descends from the vertical portion of the pipe D, to carry off the condensed steam, and $c$ is a valve in the same, through which the accumulations may be allowed to escape from time to time. F F are chutes, communicating with the lower part of the casing, and extending to the several burrs of the mill, to conduct the steamed grain to the latter.

These chutes may be one, two, or more in number, according to the number of burrs, and are each provided with a cut-off slide, G, by means of which the grain may be made to pass through any or all of said chutes to their respective burrs.

The steamer, as thus described, is provided with a sliding door, H, which is located in the casing B, so as to give access to the deflector and steam-nozzle for purposes of inspection or cleaning.

In the operation of the steamer, the grain passes down spout A, into casing B, where it falls upon the deflector C, and passes uniformly down the annular space, and thence through the chutes to the burrs, as indicated by the arrows, while the steam strikes the under side of the deflector, and is distributed upwardly through the descending grain in the annular space, as indicated by the dotted arrows.

By means of my improved steamer, as thus described, I am enabled to produce a better grade of flour, and to secure also a larger yield.

Having thus described my invention, what I claim as new is—

1. A deflector, C, having symmetrical sides, arranged centrally in a casing, and combined with the same, and a subjacent steam-pipe, substantially as and for the purpose described.

2. The double-convex deflector, arranged in the casing by supports $a$, and combined with the steam-pipe D, substantially as described.

3. The combination, with the casing B and the deflector C, of the steam-pipe D, having perforated nozzle and drain-pipe E, substantially as described.

4. The casing B, having communicating chutes provided with cut-off slides, in combination with the deflector C, and the steam-pipe D, as described.

5. The combination, with the deflector C and the steam-pipe D, of the casing B, having a door, H, arranged to permit the inspection of the said deflector and pipe, as described.

EDWARD C. JONES.

Witnesses:
WILLIAM SWAIN,
WILLIAM L. BONE.